J. HUNTER.
MEAL BINS.

No. 180,590. Patented Aug. 1, 1876.

WITNESSES:
C. Neveux
John Goethals

INVENTOR:
J. Hunter
BY
ATTORNEYS.

UNITED STATES PATENT OFFICE.

JOHN HUNTER, OF ASHLAND, PENNSYLVANIA.

IMPROVEMENT IN MEAL-BINS.

Specification forming part of Letters Patent No. 180,590, dated August 1, 1876; application filed July 11, 1876.

*To all whom it may concern:*

Be it known that I, JOHN HUNTER, of Ashland, in the county of Schuylkill and State of Pennsylvania, have invented a new and Improved Flour-Chest, of which the following is a specification:

My invention consists of a kneading-trough, kneading-board, and a flour-sieve contrived in connection with a flour-chest, so as to be more convenient and easier to use than as commonly arranged.

Figure 1:
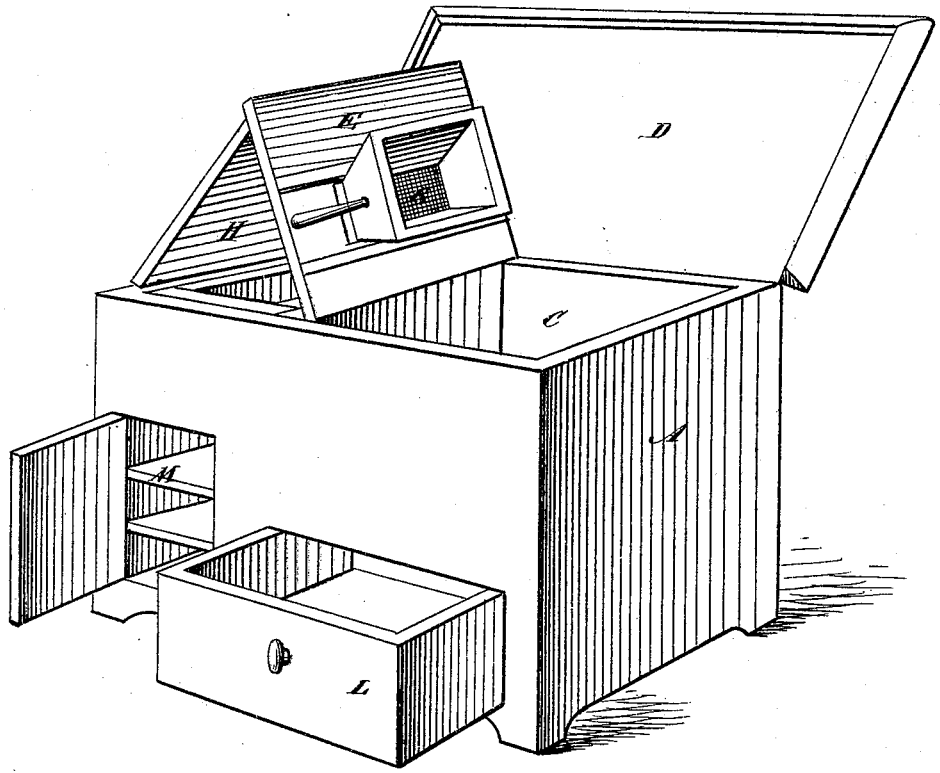
Figure 2:
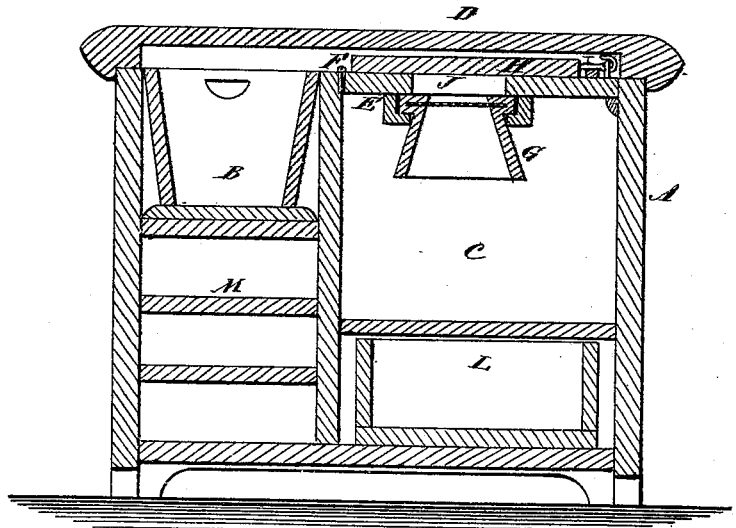

Figure 1 is a perspective view of my improved flour-chest, together with adjuncts for mixing and preparing the flour for baking; and Fig. 2 is a sectional elevation.

Similar letters of reference indicate corresponding parts.

A is the flour-chest, in which is a kneading-trough, B, at one side of the flour-bin C, over both of which is a chest-cover, D. The flour-bin is closed by a cover, E, which is hinged to the partition F, and it has a sliding sieve, G, attached to its under side, and a kneading-board, H, hinged to its upper side at I, so that the cover E may, in opening the bin C to get the flour, be turned over the kneading-trough, and hold the sieve in position for sifting the flour into the trough through an opening, J, in the cover E. Then, when the cover E is turned back to close the flour-bin, the kneading-board comes into position for kneading the dough, thus making a very compact and convenient apparatus.

Below the flour-bin I propose to have one or more drawers, L, for corn-meal and buckwheat-flour, and under the kneading-trough may be a cupboard, M, or other closet.

Having thus described my invention, I claim as new and desire to secure by Letters Patent—

The combination, in a flour-chest, A, of a flour-bin, C, cover E, sieve G, kneading-trough B, and kneading-board H, substantially as specified.

JOHN HUNTER.

Witnesses:
    J. C. GARNER,
    E. B. HUNTER.